(12) United States Patent
Freeman

(10) Patent No.: US 10,451,082 B2
(45) Date of Patent: Oct. 22, 2019

(54) ANTI-ROTATION FEATURE FOR WEAR LINERS

(71) Applicant: United Technologies Corporation, Farmington, CT (US)

(72) Inventor: Thomas Freeman, Kennebunk, ME (US)

(73) Assignee: UNITED TECHNOLOGIES CORPORATION, farmington, CT (US)

(*) Notice: Subject to any disclaimer, the term of this patent is extended or adjusted under 35 U.S.C. 154(b) by 487 days.

(21) Appl. No.: 15/237,758

(22) Filed: Aug. 16, 2016

(65) Prior Publication Data

US 2018/0051713 A1 Feb. 22, 2018

(51) Int. Cl.
| | |
|---|---|
| *F04D 29/52* | (2006.01) |
| *F01D 9/04* | (2006.01) |
| *F01D 25/24* | (2006.01) |
| *F02K 3/06* | (2006.01) |
| *F02K 3/068* | (2006.01) |
| *F04D 29/32* | (2006.01) |
| *F01D 5/30* | (2006.01) |

(52) U.S. Cl.
CPC .......... *F04D 29/526* (2013.01); *F01D 9/042* (2013.01); *F01D 25/246* (2013.01); *F02K 3/06* (2013.01); *F02K 3/068* (2013.01); *F04D 29/325* (2013.01); *F01D 5/3092* (2013.01); *F05D 2220/36* (2013.01); *F05D 2260/36* (2013.01)

(58) Field of Classification Search
CPC ...... F04D 29/526; F04D 29/325; F02K 3/068; F02K 3/06; F01D 25/246; F01D 9/042; F01D 5/3092; F05D 2260/36; F05D 2220/36

USPC .......................................................... 60/226.1
See application file for complete search history.

(56) References Cited

U.S. PATENT DOCUMENTS

| | | | | |
|---|---|---|---|---|
| 4,786,232 A | * | 11/1988 | Davis | F01D 11/08 415/138 |
| 5,074,752 A | * | 12/1991 | Murphy | F01D 9/042 415/119 |
| 5,201,887 A | * | 4/1993 | Bruchez, Jr. | F02K 1/82 60/725 |
| 6,637,186 B1 | * | 10/2003 | Van Duyn | F01D 11/12 415/9 |
| 2013/0177400 A1 | | 7/2013 | Ring | |
| 2013/0195605 A1 | * | 8/2013 | Robertson | F01D 11/125 415/1 |

(Continued)

FOREIGN PATENT DOCUMENTS

| | | |
|---|---|---|
| FR | 2967730 A1 | 5/2012 |
| WO | 2014051988 A1 | 4/2014 |

OTHER PUBLICATIONS

European Search Report for Application No. 17184801.3-1610; Report dated Dec. 22, 2017; 1-8 pages.

*Primary Examiner* — J. Todd Newton
(74) *Attorney, Agent, or Firm* — Cantor Colburn LLP

(57) ABSTRACT

A gas turbine engine and an anti-rotation feature is disclosed. The gas turbine engine includes a fan case, a stator disposed within the fan case, and a wear liner disposed between the fan case and the stator, the wear liner including a wear liner body, and an anti-rotation feature affixed to the wear liner body, wherein the anti-rotation feature includes at least one mating surface to engage the stator to prevent rotation of the wear liner body.

20 Claims, 4 Drawing Sheets

(56) References Cited

U.S. PATENT DOCUMENTS

2013/0195635 A1\* 8/2013 Robertson, Jr. ....... F01D 11/122
 415/197
2015/0240663 A1\* 8/2015 Ring ...................... F01D 9/042
 415/208.1
2015/0292342 A1\* 10/2015 Ring ...................... F01D 9/041
 415/208.2

\* cited by examiner

ANTI-ROTATION FEATURE FOR WEAR LINERS

BACKGROUND

The present disclosure relates to wear liners for gas turbine engines, and more particularly to wear liners with anti-rotation features for gas turbine engines.

Wear liners for gas turbine engines can be utilized to minimize wear due to relative movement between components within the engine. During operation, movement of the stator can cause rotation of the wear liner that may cause wear to the fan case of the engine.

Accordingly, it is desirable to provide wear liners that can prevent rotation during operation.

BRIEF SUMMARY

According to an embodiment, a wear liner for use with a fan case with a stator disposed therein includes a wear liner body disposed between the fan case and the stator, and an anti-rotation feature affixed to the wear liner body, wherein the anti-rotation feature includes at least one mating surface to engage the stator to prevent rotation of the wear liner body.

In addition to one or more of the features described above, or as an alternative, further embodiments could include that the wear liner is circumferentially disposed within the fan case.

In addition to one or more of the features described above, or as an alternative, further embodiments could include that the wear liner body is formed from a plurality of wear liner portions.

In addition to one or more of the features described above, or as an alternative, further embodiments could include that the wear liner body includes a wear liner groove.

In addition to one or more of the features described above, or as an alternative, further embodiments could include that the anti-rotation feature is affixed to the wear liner groove.

In addition to one or more of the features described above, or as an alternative, further embodiments could include that the wear liner body includes a wear liner lip.

In addition to one or more of the features described above, or as an alternative, further embodiments could include that the anti-rotation feature is affixed to the wear liner lip.

In addition to one or more of the features described above, or as an alternative, further embodiments could include that the anti-rotation feature is integrally formed with the wear liner body.

In addition to one or more of the features described above, or as an alternative, further embodiments could include that the anti-rotation feature is formed from at least one of metal, composite material, plastic, and ceramic.

According to an embodiment, a gas turbine engine includes a fan case, a stator disposed within the fan case, and a wear liner disposed between the fan case and the stator, the wear liner including a wear liner body, and an anti-rotation feature affixed to the wear liner body, wherein the anti-rotation feature includes at least one mating surface to engage the stator to prevent rotation of the wear liner body.

In addition to one or more of the features described above, or as an alternative, further embodiments could include a load dam affixed to an interior surface of the fan case to engage the stator to prevent rotation of the stator relative to the fan case.

In addition to one or more of the features described above, or as an alternative, further embodiments could include that the anti-rotation feature is aligned with the load dam.

In addition to one or more of the features described above, or as an alternative, further embodiments could include that the at least one mating surface engages a stator edge of the stator.

In addition to one or more of the features described above, or as an alternative, further embodiments could include that the wear liner is circumferentially disposed within the fan case.

In addition to one or more of the features described above, or as an alternative, further embodiments could include that the wear liner body is formed from a plurality of portions.

In addition to one or more of the features described above, or as an alternative, further embodiments could include that the wear liner body includes a wear liner groove.

In addition to one or more of the features described above, or as an alternative, further embodiments could include that the anti-rotation feature is affixed to the wear liner groove.

In addition to one or more of the features described above, or as an alternative, further embodiments could include that the wear liner body includes a wear liner lip.

In addition to one or more of the features described above, or as an alternative, further embodiments could include that the anti-rotation feature is affixed to the wear liner lip.

In addition to one or more of the features described above, or as an alternative, further embodiments could include that the anti-rotation feature is integrally formed with the wear liner body.

Other aspects, features, and techniques of the embodiments will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments provide a wear liner with an anti-rotation feature. The anti-rotation feature of the wear liner can prevent rotation of the wear liner during operation to prevent wear to the fan case and further facilitate disassembly.

Figure 1:
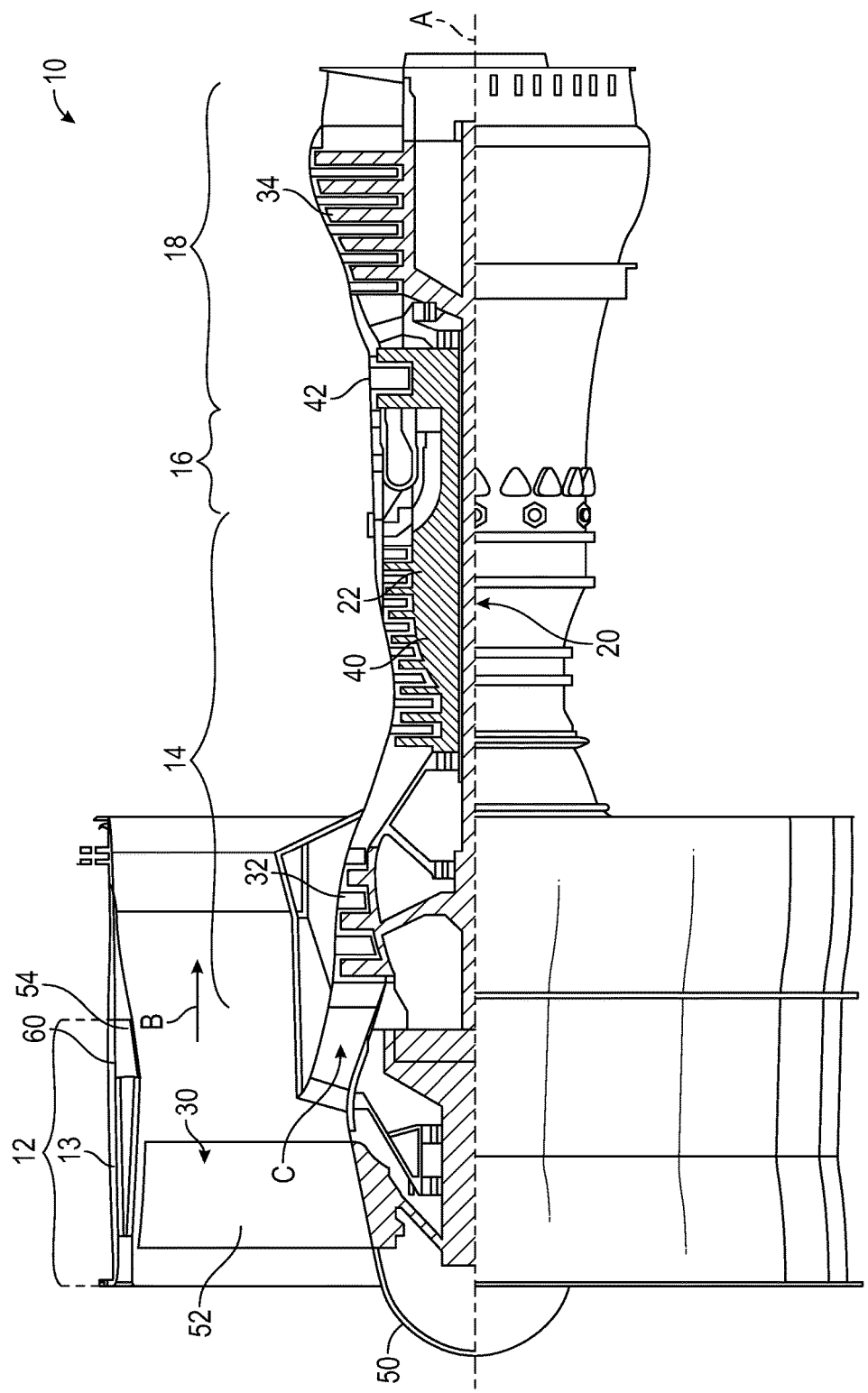
FIG. 1 is a schematic, partial cross-sectional view of a turbomachine in accordance with this disclosure.

Referring to FIG. 1 a schematic representation of a gas turbine engine 10 is shown. The gas turbine engine includes a fan section 12, a compressor section 14, a combustor section 16, and a turbine section 18 disposed about a longitudinal axis A. The fan section 12 drives air along a bypass flow path B that may bypass the compressor section 14, the combustor section 16, and the turbine section 18. The compressor section 14 draws air in along a core flow path C where air is compressed by the compressor section 14 and is provided to or communicated to the combustor section 16. The compressed air is heated by the combustor section 16 to generate a high pressure exhaust gas stream that expands through the turbine section 18. The turbine section 18 extracts energy from the high pressure exhaust gas stream to drive the fan section 12 and the compressor section 14.

The gas turbine engine 10 further includes a low-speed spool 20 and a high-speed spool 22 that are configured to rotate the fan section 12, the compressor section 14, and the turbine section 18 about the longitudinal axis A. The low-speed spool 20 may connect a fan 30 of the fan section 12 and a low-pressure compressor portion 32 of the compressor section 14 to a low-pressure turbine portion 34 of the turbine section 18. The high-speed spool 22 may connect a high pressure compressor portion 40 of the compressor section 14 and a high pressure turbine portion 42 of the turbine section 18.

The fan 30 includes a fan rotor or fan hub 50 that carries a fan blade 52. The fan 30 can include a fan case 13. The fan blade 52 radially extends from the fan hub 50. In certain embodiments, the fan case 13 further includes a stator 54 to direct and accelerate airflow within the gas turbine engine 10.

In the illustrated embodiment, a wear liner 60 is disposed between the stator 54 and the fan case 13 to prevent movement of the stator 54 from wearing or otherwise damaging the fan case 13. In certain embodiments, the wear liner 60 can include an anti-rotation feature to prevent the rotation of the wear liner 60 during operation. Advantageously, by constraining rotation of the wear liner 60 wear to the fan case 13 can be minimized. Further, disassembly of the fan case 13 can be simplified by rotationally retaining the wear liner 60.

Figure 2:
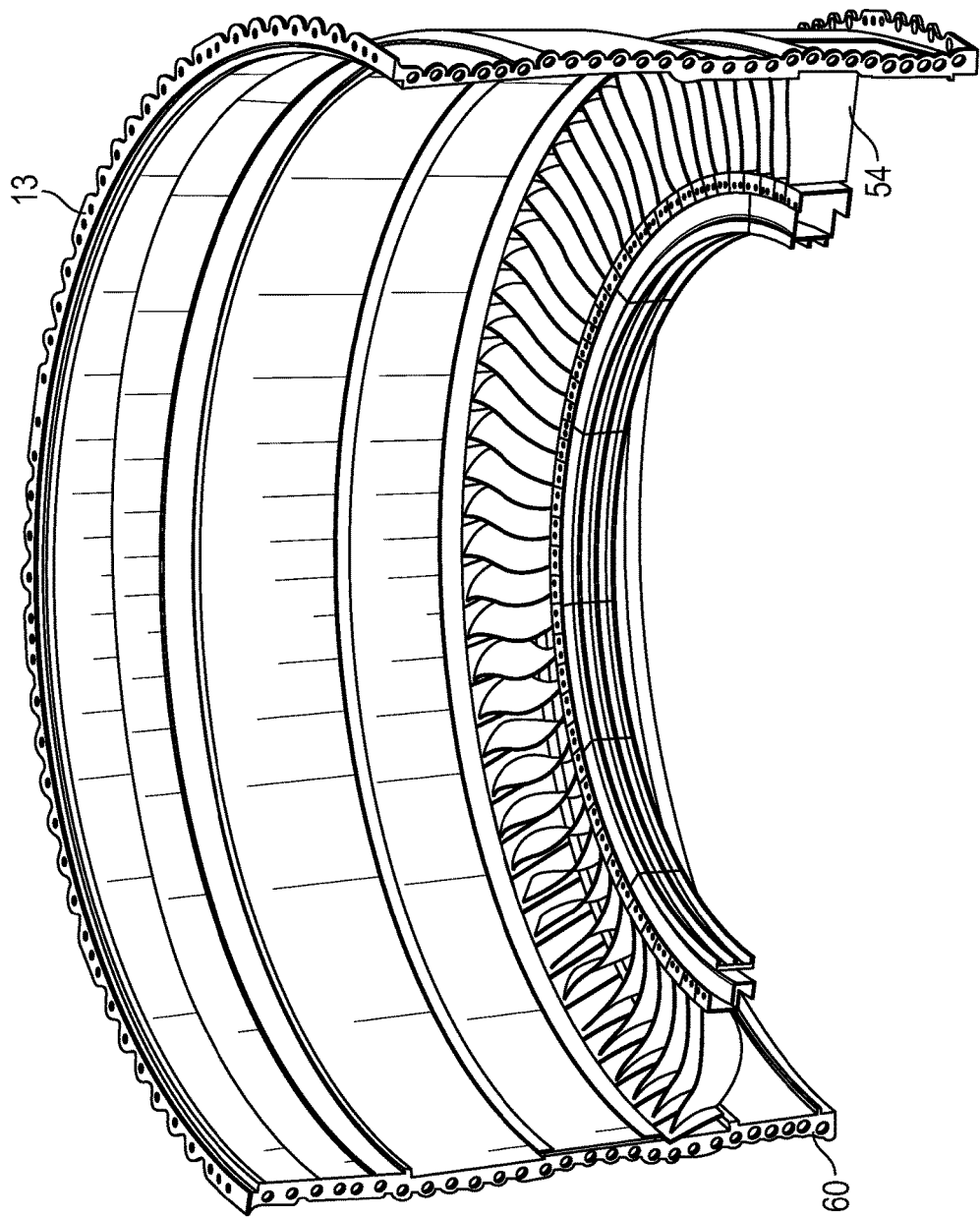
FIG. 2 is an isometric, partial view of a fan case for use with the turbomachine of FIG. 1.

Referring to FIG. 2, a portion of the fan case 13 for use with the gas turbine engine 10 is shown. In the illustrated embodiment, the fan case 13 is shown with the stator 54 and the wear liner 60. The fan case 13, stator 54, and the wear liner 60 can each be separated into portions to facilitate assembly and disassembly as needed. In the illustrated embodiment, one half of each of the fan case 13, the stator 54, and the wear liner 60 is shown. The fan case 13, the stator 54, and the wear liner 60 can be assembled with a corresponding component to form portions of the gas turbine engine 10.

Referring to FIGS. 2-5, the stator 54 disposed within the fan case 13 is shown. In the illustrated embodiment, the stator 54 includes a plurality of stator vanes 56 having edges 55. In the illustrated embodiment, the stator 54 can be utilized to direct and accelerate air flow within the fan region of the gas turbine engine.

Figure 3:
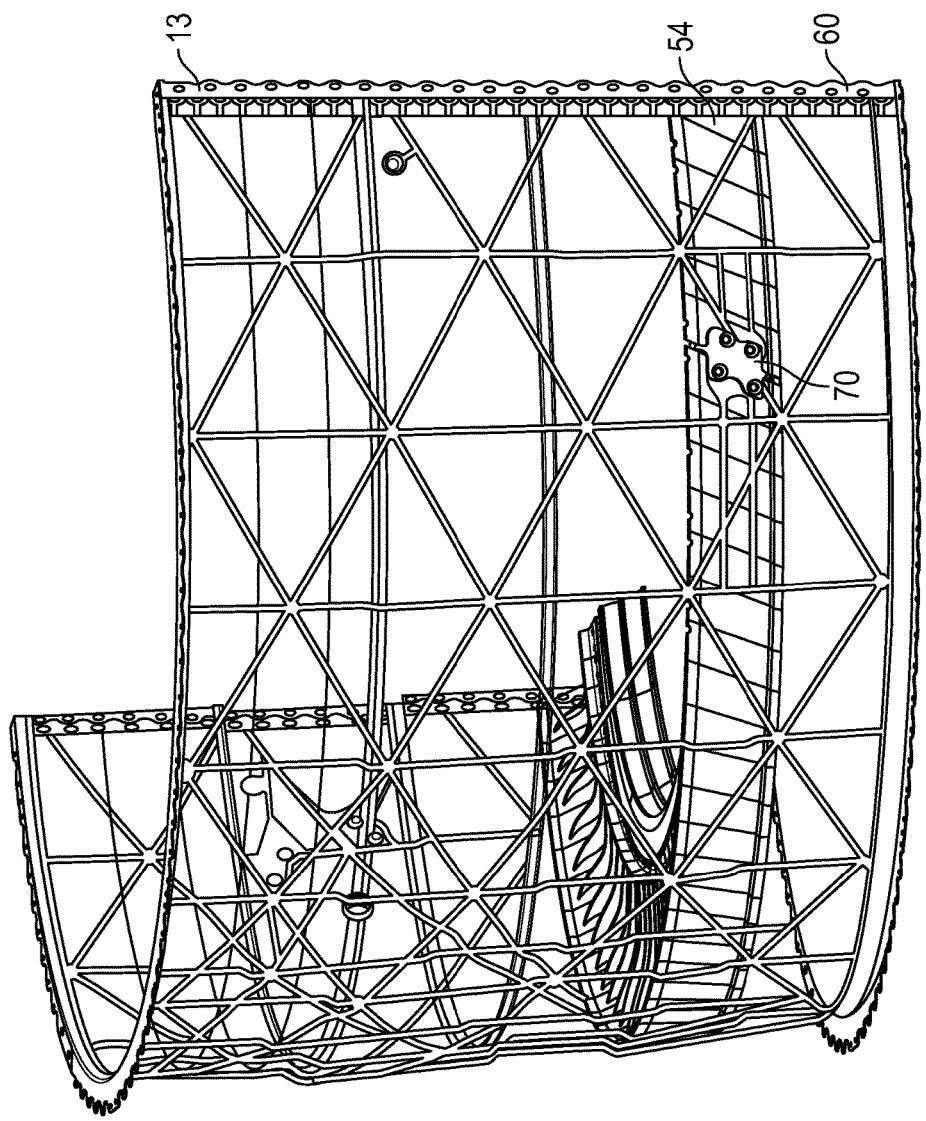
FIG. 3 is an isometric, partial view of the fan case of FIG. 2 with the fan case partially removed.
Figure 4:
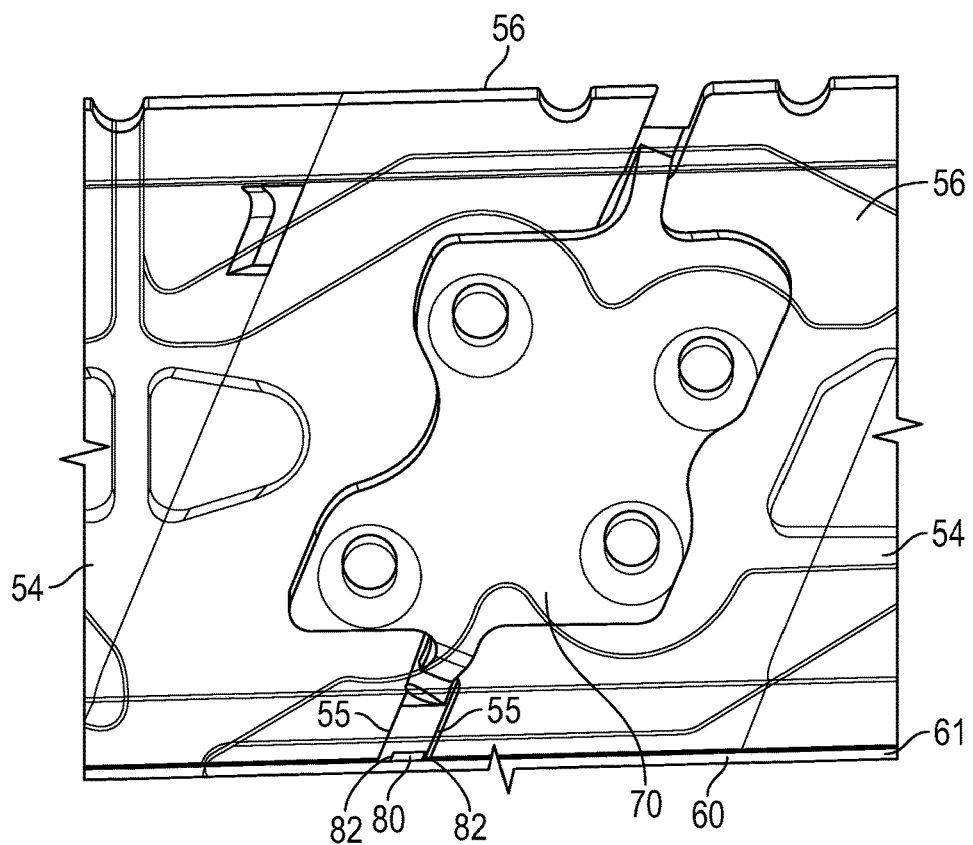
FIG. 4 is a pictorial view of an anti-rotation feature for use with the turbomachine of FIG. 1.

During operation, stator 54 may experience rotational forces in response to gas loads, urging the stator 54 to rotate. As best shown in FIGS. 3 and 4, a load dam 70 affixed to the fan case 13 can be utilized to prevent rotation of the stator 54. In the illustrated embodiment, the load dam 70 can prevent the stator 54 from rotating relative to the fan case 13 in response to gas loads and other forces that may impart a rotational force. In certain embodiments, the stator 54 may still move in response to operational forces.

Figure 5:
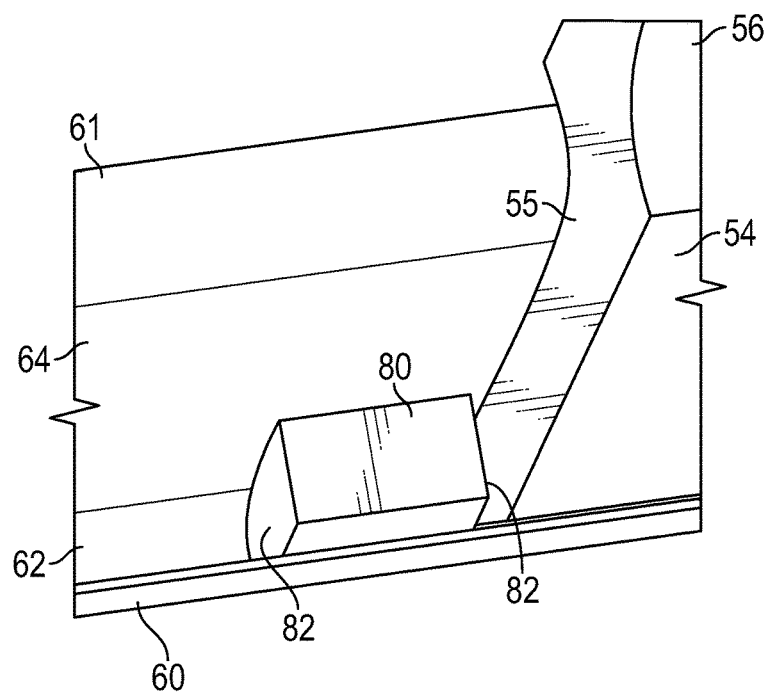
FIG. 5 is a detail view of the anti-rotation feature of FIG. 4.

Referring to FIGS. 4 and 5, the wear liner 60 disposed between the fan case 13 and the stator 54 is shown. In the illustrated embodiment, the wear liner 60 includes a wear liner body 61, a wear liner groove 62, a wear liner lip 64 and an anti-rotation feature 80. The wear liner 60 can be formed from a thin wear material that provides desirable wear characteristics. Advantageously, the wear liner 60 can provide a replaceable wear surface within the fan case 13 to prevent wear to the fan case 13 during operation.

In the illustrated embodiment, the wear liner body 61 can have a generally circumferential shape. In certain embodiments, the wear liner 60 can be formed of multiple portions that can be joined to form a circular hoop or circumferential shape. In the illustrated embodiment, the wear liner groove 62 can at least partially receive the stator 54. Further, in certain embodiments, the wear liner lip 64 can at least partially receive the stator 54 and can provide a radial wear surface for the stator 54.

During operation, the wear liner 60 may experience rotational forces due to shifting of the stator 54. In the illustrated embodiment, the wear liner 60 includes an anti-rotational feature 80. In the illustrated embodiment, the anti-rotational feature 80 includes at least one mating surface 82. In the illustrated embodiment, the anti-rotational feature 80 of the wear liner 60 engages the stator 54 to prevent rotation of the wear liner 60 in response to rotational forces.

In the illustrated embodiment, the anti-rotation feature 80 is a generally rectangular shape, while in other embodiments, the anti-rotation feature 80 can be any suitable shape. In certain embodiments, the anti-rotation feature 80 can be integrally formed with the wear liner 60. In other embodiments, the anti-rotation feature 80 can be separately formed and affixed to the wear liner 60 with adhesive, welding, or any other suitable method to attach the anti-rotation feature 80. The anti-rotation feature 80 can be formed from the same material as the wear liner 60 or can be formed from any other suitable material, including, but not limited to composites, plastic, ceramics, metal, etc.

In the illustrated embodiment, the anti-rotation feature 80 is disposed between vanes 56 of the stator 54 to be circumferentially aligned with the load dam 70. Therefore, the anti-rotation feature 80 does not allow the wear liner 60 to rotate past the vanes 56 adjacent to the anti-rotation feature 80.

In certain embodiments, the anti-rotation feature 80 is disposed at least partially in the wear liner groove 62. In certain embodiments, the anti-rotation feature 80 is disposed at least partially on the wear liner lip 64.

In the illustrated embodiment, the anti-rotation feature 80 can prevent rotation of the wear liner 60 by engaging the edges 55 of the stator vanes 56. In certain embodiments, the mating surfaces 82 and the stator edges 55 can have parallel contact interface.

During operation rotational forces of the wear liner 60 can cause the anti-rotation feature 80 to engage the stator vanes 56 or the stator edges 55. In the illustrated embodiment, the stator 54 can receive the rotational force from the anti-rotation feature 80 of the wear liner 60. As previously described, rotational forces against the stator 54 can be constrained by the load dam 70 which is affixed to the fan case 13. Therefore, the anti-rotation feature 80 can prevent rotational movement of the wear liner 60. Advantageously, by preventing rotation of the wear liner 60, wear within the fan case 13 can be reduced. Further, by preventing unintended rotation of the wear liner 60, disassembly of the fan case 13 and the gas turbine engine 10 can be simplified since the wear liner 60 remains in an aligned position.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. In combination, a wear liner and a fan case, the combination of the wear liner and fan case comprising:
   a stator disposed within the fan case, the stator comprising a first stator vane and a second stator vane;
   a wear liner body disposed between the fan case and the stator; and
   an anti-rotation feature affixed to the wear liner body and disposed between the first stator vane and the second stator vane, wherein the anti-rotation feature includes a first mating surface to engage an edge of the first stator vane and a second mating surface to engage an edge of the second stator vane to prevent rotation of the wear liner body.

2. The wear liner of claim 1, wherein the wear liner is circumferentially disposed within the fan case.

3. The wear liner of claim 1, wherein the wear liner body is formed from a plurality of wear liner portions.

4. The wear liner of claim 1, wherein the wear liner body includes a wear liner groove.

5. The wear liner of claim 4, wherein the anti-rotation feature is affixed to the wear liner groove.

6. The wear liner of claim 1, wherein the wear liner body includes a wear liner lip.

7. The wear liner of claim 6, wherein the anti-rotation feature is affixed to the wear liner lip.

8. The wear liner of claim 1, wherein the anti-rotation feature is integrally formed with the wear liner body.

9. The wear liner of claim 1, wherein the anti-rotation feature is formed from at least one of metal, composite material, plastic, and ceramic.

10. A gas turbine engine comprising:
    a fan case;
    a stator disposed within the fan case, stator comprising a first stator vane and a second stator vane; and
    a wear liner disposed between the fan case and the stator, the wear liner including:
      a wear liner body; and
      an anti-rotation feature affixed to the wear liner body and disposed between the first stator vane and the second stator vane, wherein the anti-rotation feature includes a first mating surface to engage an edge of the first stator vane and a second mating surface to engage an edge of the second stator vane to prevent rotation of the wear liner body.

11. The gas turbine engine of claim 10, further comprising a load dam affixed to an interior surface of the fan case to engage the stator to prevent rotation of the stator relative to the fan case.

12. The gas turbine engine of claim 11, wherein the anti-rotation feature is aligned with the load dam.

13. The gas turbine engine of claim 10, wherein the at least one mating surface engages a stator edge of the stator.

14. The gas turbine engine of claim 10, wherein the wear liner is circumferentially disposed within the fan case.

15. The gas turbine engine of claim 10, wherein the wear liner body is formed from a plurality of portions.

16. The gas turbine engine of claim 10, wherein the wear liner body includes a wear liner groove.

17. The gas turbine engine of claim 16, wherein the anti-rotation feature is affixed to the wear liner groove.

18. The gas turbine engine of claim 10, wherein the wear liner body includes a wear liner lip.

19. The gas turbine engine of claim 18, wherein the anti-rotation feature is affixed to the wear liner lip.

20. The gas turbine engine of claim 10, wherein the anti-rotation feature is integrally formed with the wear liner body.

* * * * *